July 16, 1968 J. W. TOENSING 3,392,652
LIGHT SHIELD FOR PHOTOPRINTER FRAMES
Filed Feb. 4, 1966
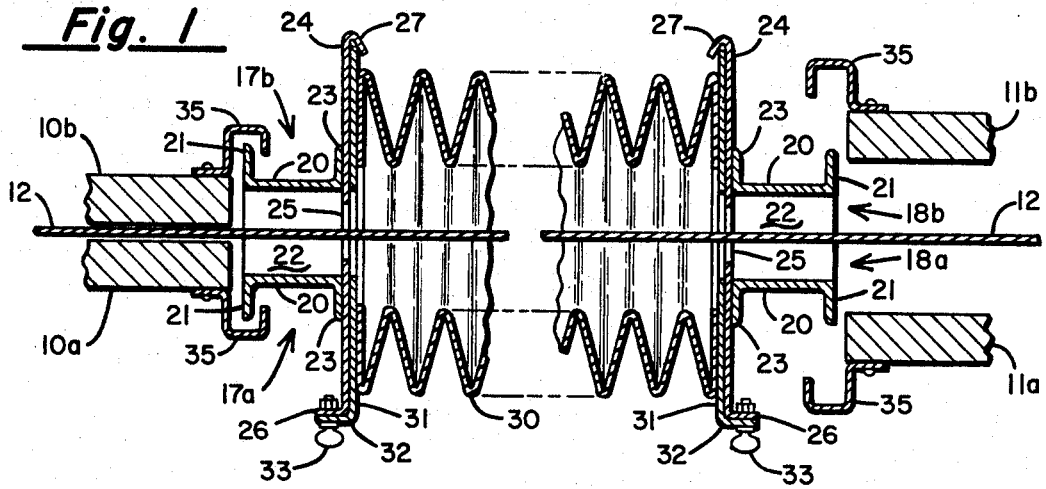
Fig. 1
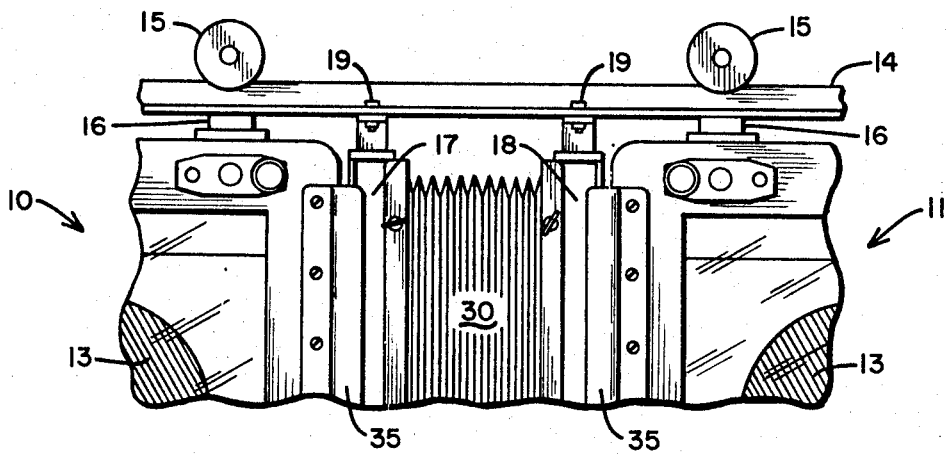
Fig. 2
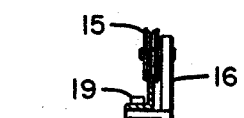
Fig. 3
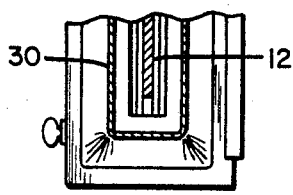
INVENTOR
JAMES W. TOENSING
BY Stryker & Jacobson
ATTORNEYS

3,392,652
LIGHT SHIELD FOR PHOTOPRINTER FRAMES
James W. Toensing, Minneapolis, Minn., assignor, by mesne assignments, to Buckbee-Mears Company, St. Paul, Minn., a corporation of Minnesota
Filed Feb. 4, 1966, Ser. No. 525,032
5 Claims. (Cl. 95—75)

This invention relates generally to the field of photoprinting apparatus and is specifically directed toward improvement in means for minimizing or eliminating the effect of light leakage in a photoprinting process.

This invention is particularly directed toward improving photoprinting on a continuous strip of light-sensitive material. Although the invention appears to achieve the various features and advantages to the greatest degree when used in a system having multiple photoprinting stations all of which act on a single continuous sheet of sensitized material, it is not limited to such use and can be used advantageously in a single photoprinting station. A typical multistation system will now be briefly described.

The system may entail a series of photoprinting stations adjacent one another through which a continuous strip of metal webbing is transported in an intermittent stop-and-go manner. Each of the photoprinting stations comprises a photoprinting frame having front and back members which are hinged together at their top so that they can be swung apart to allow the metal strip to pass between them and can be swung together when the strip is stopped for contact photoprinting. At least one of the members, and preferably both, contains a glass photoprinting plate which is a negative or positive and defines the pattern which is to be photoprinted on the metal web. Of course prior to the photoprinting operation the webbing is coated with a suitable light sensitive material. When the sensitized webbing is stopped the front and back members are swung together to contact the front and back sides of the webbing and a suitable actinic light source is energized for a suitable period of time sufficient to print the pattern on the coated webbing. The printing frame is then swung open and the strip travels through the printing frames until the next section of the webbing is in position for printing. The webbing is then stopped, the members swung together again and the photoprinting step repeated. Among other things, this processing system has provided the means for mass producing precision articles. For example, color TV aperture masks, which are metal sheets having a multitude of precision apertures in a predefined precise pattern array, are made in this manner. The apertures are initially defined by the photoprinting process such as briefly described, and are formed later by etching away the unprotected areas in the photoprinted pattern. The importance then of shielding the metal web from extraneous light after it has been coated with the light sensitive material and before the coating has been developed out is apparent. It is, therefore, the general object of this invention to provide improved means for shielding a light-sensitive continuous strip of material against the harmful effects of extraneous light.

As pointed out earlier, the photoprinting frame must be constructed so that it can be swung open to allow the continuous strip to advance through the photoprinting station but, on the other hand, it must be constructed so that the light doesn't leak around the outer edges of the frame during the photoprinting operation. Therefore, it is a more specific object of this invention to provide means for allowing the front and back members of a photoprinting frame to be swung apart to permit a strip of light-sensitive material to be pulled therebetween but at the same time sealing the edges of the frame against light leaking onto the strip of material when the frame is closed.

Heretofore, the manner of shielding the strip from the light as it travelled between adjacent printing stations was to attach an opaque curtain to adjacent front and back members to cover the strip between adjacent frames. However, as the frames were respectively swung open and closed, movement of the curtains would stir up the surrounding air and blow around dust which would fall on the glass printing plates or on the coated webbing and in general would produce a quality control problem. Therefore, it is still a further object of this invention to provide means for completely covering the light-sensitive material between adjacent printing stations at all times without producing problems with dust and dirt.

A still further object of this invention is to achieve the foregoing objects with means which will permit some adjustment of the front and back printing frame members when trying to register them one to another and will permit substantial lateral positioning of the frames as the need arises such as when the pattern being printed is changed.

These and other objects and features of the invention will become apparent during the course of the following detailed description with reference to the accompanying drawings in which:

FIG. 1 is a sectional view looking down on a portion of a photoprinting system which contains a preferred embodiment of the invention showing fragmentary portions of a pair of photoprinting frames with the light sealing means in between;

FIG. 2 is a fragmentary front view of a multiple-frame photoprinting system showing the relative positions of the frames and containing the preferred embodiment of the invention, and FIG. 3 is a fragmentary sectional side view between adjacent photoprinting frames showing the relative positions of some of the various elements which make up the preferred embodiment of the invention.

The photoprinting frames, such as 10 and 11, in a multiple-frame photoprinting system comprise front frame members 10a and 11a and back frame members 10b and 11b which, when respectively closed together, are in a vertical plane. Preferably the front and back members are pivotally connected together at the top in a manner such as described in detail in Brown Patent 3,199,430 titled Photoprinting Apparatus. This allows the members to be swung open to allow the continuous strip of material 12 which is coated with a light sensitive material, to pass through the frames between the front and back members and permits the members to be closed together so that their plates make contact with the strip 12 during photoprinting. Preferably both the front and back frame members contain photographic plates, such as 13, which define the pattern which is to be photoprinted on the front and back sides of the strip 12. As described in detail in the Brown patent, supra, the manner of attaching the front and back members to one another not only permits them to swing open when the need arises, but also provides adjustments for the members to be properly registered to one another before printing. The printing frames 10 and 11 may be suspended from a horizontal rigid beam 14 and may also be supported at the floor in any convenient manner, not shown. The beam 14 also serves as a track carrying wheels 15 from which support bars 16 depend. The detailed construction of the support arrangement is not essential to the present invention. Suffice it to point out that the manner of support is such that the frames 10 and 11 may be adjusted laterally as the occasion depends to locate the printing position on the continuous strip 12 and that when the frames are properly positioned they may be securely locked and held until realignment again becomes necessary. Of course, during normal use some minor adjustments may be necessary to bring the patterns on the printing plates into precise registration but that may be accomplished without disturbing the main supporting members.

Along the side edges of each of the printing frames 10 and 11 are vertical U-shaped channel beams 17 and 18 respectively which may be bolted or otherwise secured at their upper ends to the horizontal beam 14. The securing bolts 19 can be loosened if need be to permit right or left adjustment of the channel beams 17 and 18 which may be necessary when any substantial lateral adjustment of the printing frames 10 and 11 is done. In the case of a photoprinting system in which both the front and back members of the printing frames carry printing plates and swing open and closed, such as in the presently described system, each of the frame members has separate vertical channel beams alongside it. As seen in FIG. 1, channel beams 17a and 17b are along the right side of the frame members 10a and 10b respectively and channel beams 18a and 18b are along the left side of frame members 11a and 11b respectively. It can be observed that the beams are arranged so that the bottom walls 20 of the channel troughs are opposite one another but are spaced apart and that a side wall 21 of the channel trough runs alongside the associated frame member. The channel trough faces outward, that is, in the same direction as its associated frame member swings open. For example, the trough of channel 17a faces frontward and the trough of channel 17b faces rearward in the same directions that the respective frame members 10a and 10b swing open. As observed in FIG. 1, the gap between the front and rear channel alongside each of the frames provides a slot-like opening 22 through which the continuous strip 12 travels.

At the other side wall 23 of the channel trough, that is the wall furthest removed from the associated printing frame, metal skirts 24 are welded and have annular openings 25 slightly smaller than those openings 22 between the channels 17a and 17b and between 18a and 18b. However, the openings 25 are large enough to allow the strip 12 to pass therethrough freely. The front and back channels 17a and 17b and 18a and 18b are connected together at their tops (not shown) and the skirt 24 extends completely around the opening 22 defined by the sets of two channels. The skirts 24 have a 90° flange 26 at their front edges and at their back edges have flared flanges 27. There is a metal skirt 24 for each of the channels 17 and 18.

Between the left and right hand skirts 24, which are fixedly attached to the channels 17 and 18, is a curtain 30 made of an opaque, pliable material. This is preferably some type of plastic material which is constructed in an accordion pleated fashion. The curtain is constructed so that it completely surrounds the light sensitized strip 12. The curtain 30 is cemented at each end to flat plate members 31 which have annular openings similar to those in the skirts 24 so that the strip 12 can pass therethrough freely. The straight flat rear edges of the curtain plates 31 are slipped into engagement with the flared flanges 27 of skirts 24 and the 90° flange 32 at the front of the plates 31 are butted up against the corresponding flanges 26 of the skirts 24. Thumb screws 33 are used to detachably secure the curtain 30 to the skirts 24 to thereby shield the area between adjacent channel members from light. It can be observed that in normal use the curtain 30 is stationary and only has to be moved when laterally adjusting the frames and channels which will only occur when the system is shut off.

Attached along the side edges of the front and back members of printing frames 10 and 11 are light shield strips 35. These shields are made of some relatively rigid material and are opaque either because of the material itself or a coating layer. The major portion of the shield strip 35 extends beyond the side edge of the associated frame member and is bent so that in horizontal cross section it is U-shaped with one leg of the U somewhat shorter than the other. The shields 35 are arranged to face opposite the trough in the channel beams 17 and 18 and to overlap the adjacent side walls 21 of said beams. Preferably the entire surface area of the shield strips 35 as well as the channel beams 17 and 18 are coated with a flat black paint which will absorb light and have minimum reflection. It can be observed that when the frame members are closed together, such as illustrated in FIG. 1 by the position of members 10a and 10b, light coming from in front or back of the printing frame 10 must travel a serpentine path to reach the sensitized strip 12 along the side edges of the frame. The only manner in which the light can reach the strip 12 is by numerous reflections off the inner surfaces of the channel beam 17 and the shield strip 35. Because there is substantial absorption of light as it travels this zig-zag path, the intensity of the light which might reach the sensitized strip 12 at the side edges of the frame is so negligible that it has no effect on the strip coating. It should also be observed that a sufficient separation is provided between the shield strips 35 and the overlapped portion of the adjacent channel beams 17 and 18 so that the members of the frames 10 and 11 which carry the photoprinting plates can be adjusted during normal use to register the patterns without interfering with the freedom to swing open and closed repeatedly.

The operation of the invention and most of the features and advantages can be seen by briefly considering a typical cycle of operation of the photoprinting system. If we assume initially that the optimum center-to-center spacing between adjacent printing frames has been predetermined, the frames 10 and 11 along with their associated vertical channel beams, 17 and 18, are laterally adjusted left and right along the main support beam 14 and then are secured in position.

The end plates 31 of the accordion pleated curtain 30 are then coupled to the respective metal skirts 24 and secured thereto by tightening the thumb screws 33. By suitable means, not shown, the photoprinting frames are then swung open so that the front and back members are in a position as shown by 11a and 11b of FIG. 1. By other suitable means, not shown, the continuous strip of metal 12 which has a light sensitive coating is then fed through the photoprinting stations until it is properly located for printing. The printing frames are then closed, such as illustrated by 10a and 10b in FIG. 1, so that the photoprinting plates carried by the respective frames are in contact with opposite sides of the strip 12. Suitable sources of actinic light, likewise not shown, which are located in front and back of the printing frames are then energized for photoprinting the desired pattern on the strip 12 by the respective photoprinting plates in the usual and well-known manner. The curtain 30 prevents the light from striking the sensitized strip 12 in the area between adjacent vertical channel beams, such as 17 and 18, and the channel beams themselves shield the strip from the light in the area between the ends of the curtains and the side edges of the printing frames. Right alongside each of the printing frames in the small gap between the side walls 21 of the channel members and the adjacent side edges of the printing frames is the area which is protected against light leakage by the labrinth light seal formed by the combination of the bottom and side walls, 20 and 21, of the channel beams and the overlapping shield strips 35. After a suitable exposure time, the light source is deenergized, the frames are then swung open to permit the strip 12 to advance through, and when properly positioned the strip 12 is stopped, the printing frame members are closed together and the photoprinting step is repeated. Generally an operator monitors the system and adjusts registration of the frames if necessary. This, of course, can be done without dismantling any of the equipment.

I claim:
1. For use in photoprinting on a continuous strip of material having a light sensitive coating, in combination:
   (A) a photoprinting frame assembly having front and back members at least one of which carries a masked plate defining the pattern to be photoprinted on the strip, said front and back members being pivotally joined together at the top of the frame so that they can be swung apart to permit the strip to travel between them;
   (B) rigid, U-shaped, opaque channel members located alongside the frame but separate therefrom, with the channel trough facing outward in the same direction as the associated frame member swings open such that a side wall of the channel trough is adjacent a side edge of the frame;
   (C) and a strip of rigid opaque material attached to the side of said plate-carrying frame member and shaped to overlap the adjacent side wall of the channel trough without making contact thereto for forming a labyrinth light seal with said channel member for preventing light from striking the light-sensitive strip along the side of the printing frame when the frame members are closed together.

2. The invention as described in claim 1 wherein: both front and back frame members carry photoprinting plates for photoprinting on the front and back of the light-sensitive strip; and said channel members are located alongside both front and back frame members, those front and back channel members located on the same side of each frame assembly being separated from one another to form a slot-like opening through which the continuous strip passes.

3. A multiplicity of frame assemblies and light shields as described in claim 2:
   (D) said multiple frame assemblies arranged side-by-side such that the continuous strip passes through all of them; and
   (E) a curtain of opaque material removably attached to the channel members located between adjacent frame assemblies for enclosing the continuous strip between said adjacent frame assemblies.

4. The invention as described in claim 3, wherein:
   (F) said frame assemblies and said channel members are laterally adjustable as desired along the path of travel of the continuous strip; and
   (G) said curtains are deformable to permit substantial lateral adjustment while the continuous strip remains enclosed by the curtains.

5. The invention as in claim 3 wherein said curtain is attached to the channel members at the channel trough side wall which is opposite the wall overlapped by the strip on the associated frame member, whereby the continuous strip of light sensitive material is shielded from light leakage throughout the area between adjacent frame assemblies.

References Cited

UNITED STATES PATENTS

| | | | |
|---|---|---|---|
| 2,629,303 | 2/1953 | Grant | 95—67 |
| 3,199,430 | 8/1965 | Brown | 95—73 |
| 3,313,225 | 4/1967 | Mears | 95—75 |

NORTON ANSHER, *Primary Examiner.*

GARY M. HOFFMAN, *Assistant Examiner.*